Figure 1:
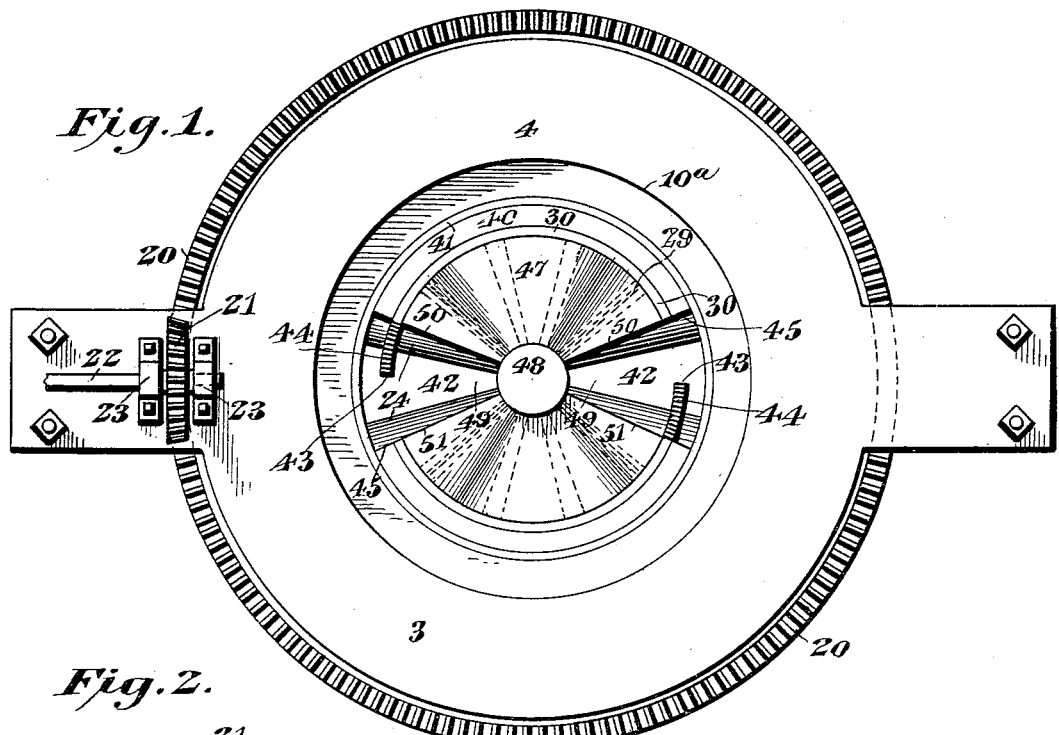

No. 733,451. PATENTED JULY 14, 1903.
J. J. ATKINSON.
COTTON PRESS.
APPLICATION FILED JUNE 12, 1902.
NO MODEL. 2 SHEETS—SHEET 1.

Joseph J. Atkinson, Inventor

Witnesses
Jas. K. McCathran
Louis G. Julihn

By E. G. Siggers
Attorney

No. 733,451. PATENTED JULY 14, 1903.
J. J. ATKINSON.
COTTON PRESS.
APPLICATION FILED JUNE 12, 1902.
NO MODEL. 2 SHEETS—SHEET 2.

Joseph J. Atkinson, Inventor

No. 733,451. Patented July 14, 1903.

UNITED STATES PATENT OFFICE.

JOSEPH J. ATKINSON, OF ATLANTA, GEORGIA.

COTTON-PRESS.

SPECIFICATION forming part of Letters Patent No. 733,451, dated July 14, 1903.

Application filed June 12, 1902. Serial No. 111,351. (No model.)

*To all whom it may concern:*

Be it known that I, JOSEPH J. ATKINSON, a citizen of the United States, residing at Atlanta, in the county of Fulton and State of Georgia, have invented a new and useful Cotton-Press, of which the following is a specification.

This invention relates to baling-presses for making round or cylindrical bales of cotton or other material and characterized by a compressing-head made up of a series of rollers, which form the bale from highly-compressed layers laid spirally to form a column of fiber which when completed constitutes the bale. In this type of presses the cotton is fed in bulk to the compressing-head, below which is disposed a follower, usually surrounded, at least during the initiation of the bale, by a collar or casing defining a baling-chamber. The recession of the follower is opposed by hydraulic or other resistance, and as the compressing-head is rotated the cotton is drawn down between the compression-rollers and wound spirally layer upon layer under sufficient compression to produce a bale of great density. Presses of this character produce bales constituting excellent shipping-packages; but they have not been employed extensively, for the reason that they are open to certain objections, to the overcoming of which my attention has been directed.

In my Patent No. 698,352 is disclosed an arrangement whereby the conical rollers of the compressing-head are positively rotated at a speed slightly greater than normal—that is to say, somewhat faster than they would be if rotated by frictional contact with a plane surface—the purpose being to overcome the swell or undulation produced in the cotton between the rollers. During the course of experiments it was found that while one of the great objections to this type of presses had been overcome by the positive rotation of the compression-rollers in the manner stated there nevertheless existed still an objectionable tendency of the cotton below the rollers to draw toward the center of the bale, resulting in the formation of a bale lacking that uniformity of density which is essential to its commercial value. In my Patent No. 698,353 is disclosed means for overcoming this inward drawing or centripetal movement of the cotton at the upper end of the bale, said means being embodied in a compression-ring, carried by the compressing-head and bearing against the upper face or end of the bale adjacent to the outer edge thereof.

My present invention constitutes a still further development in the perfection of roller-presses and is based upon the fact that the uniform feed of the cotton between the rollers from above the same is prevented by the tendency of the cotton to move outwardly, apparently under the impulse of centrifugal force due to the rotation of the compressing-head—that is to say, I have observed that in this type of presses the tendency of the cotton being fed between the rollers and the cotton located above the rollers is to move toward the outer edge of the bale, while the tendency of the cotton below the rollers is to move toward the center of the bale. The latter movement of the cotton I have overcome in my former patent, as aforesaid, and I now propose to overcome the outward movement of the cotton being fed in order to secure a uniform feed of the cotton and the uniform compression of the cotton after it has become a part of the bale. It may be said, therefore, that the present invention has for its object to provide a press of the roller-type with a feed-guide constituting means for insuring the uniform feed of the cotton by preventing the outward movement toward the outer side of the bale of the cotton being fed to the press.

To the accomplishment of this object and others subordinate thereto, as will hereinafter more fully appear, the invention in its preferred embodiment resides in that construction and arrangement of parts to be described, illustrated in the accompanying drawings, and succinctly defined in the appended claims.

Figure 2:
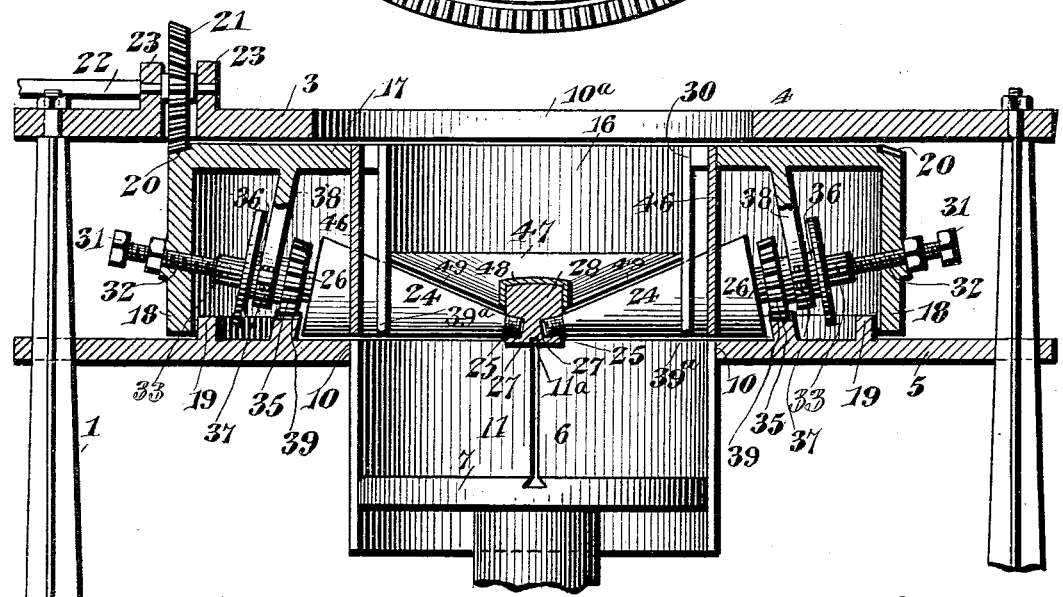
Figure 3:
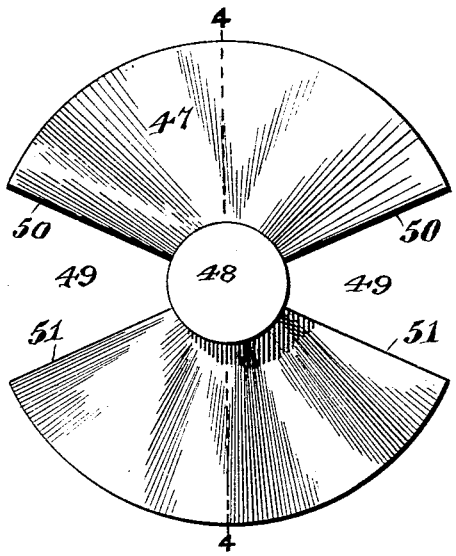
Figure 5:
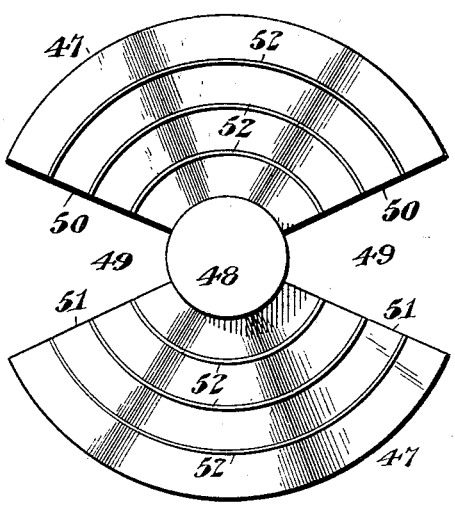
Figure 6:
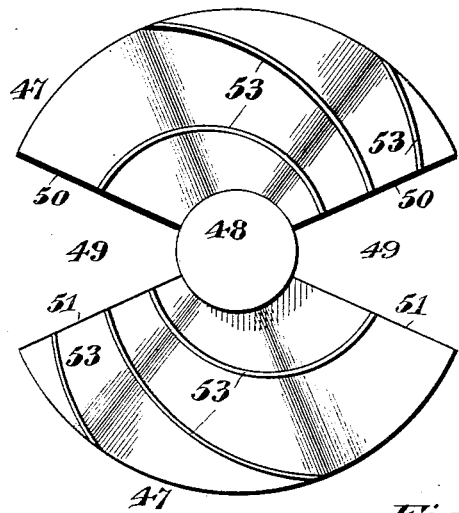
Figure 7:
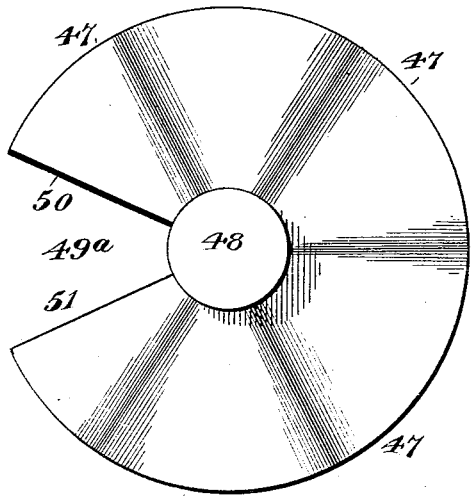
Figure 4:

In said drawings, Figure 1 is a top plan view of a roller-press embodying the present improvements, as well as those disclosed in my former patents. Fig. 2 is a sectional view of the subject-matter of Fig. 1. Fig. 3 is a plan view of one form of feed-guide, the same having a smooth upper face and a plurality of feed-openings. Fig. 4 is a sectional view on the line 4 4 of Fig. 3. Fig. 5 is a plan view of another form of feed-guide embodying concentric projections or ribs designed to present resistance to the outward movement of the cotton. Fig. 6 is still another form of guide, showing the ribs arranged spirally; and Fig. 7 is a view similar to Fig. 3, but showing a guide having a single feed-opening.

Like numerals of reference are employed to designate corresponding parts throughout the several views.

While the invention is not limited in its application to any specific form of press, I have illustrated for the purpose of this disclosure a roller-press constructed and arranged in accordance with my prior inventions and equipped with the present improvements.

The upright press-stand 1, resting upon a suitable base, supports at its upper end what I have termed a "top-supporting frame" 3, within which the principal working parts of the press are mounted. The stand comprises a pair of standards supporting the upper and lower horizontal frame-plates 4 and 5, constituting the top-supporting frame, and from the lower plate 5 depends the baling cylinder or chamber 6, which is hardly more than a collar, within which the bale is initiated.

The baling-chamber accommodates the receding follower 7, associated with suitable pressure mechanism, which, in a manner obvious to those skilled in the art, opposes such resistance to the recession of the follower as will effect the desired compression of the bale as the latter is formed in a manner to be described. The baling chamber or cylinder 6 registers with a central bale-opening 10, formed in the plate 5 in registering relation with a central opening 10ª in the upper frame-plate 4. The opening 10ª is of somewhat greater diameter than the opening 10 and is designed to permit the passage of loose cotton or other fiber to the baling mechanism. The cylinder 6 is provided, by preference, with longitudinal tie-receiving slots 11, through which the bale-ties are passed to secure the bale in the usual manner before it is delivered from the press, and the hub 28 is provided with correlative tie-receiving slots 11ª.

Within the top-supporting frame 3, immediately over the upper end of the baling cylinder or chamber 6 and constituting a rigid abutment resisting the endwise thrust of the compressed column of material within the baling-cylinder, is a compressing device or head 16, comprising a roller-carriage 17, preferably in the form of a hollow circular frame formed with an outer pendent rim 18, the lower edge of which is disposed immediately outside of an upstanding bearing-flange 19, formed upon the lower frame-plate 5 and constituting means for retaining the roller-carriage in proper position for rotary movement.

The operating means for the carriage 17 includes a gear-wheel 20, formed at the upper corner of the carriage and meshing with a driving-pinion 21, keyed upon the inner end of a driving-shaft 22, journaled in upstanding bearings 23 upon the frame-plate 4, the shaft 22 being driven by the application of power from any suitable source. The roller-carriage 17 is provided with an open center disposed in the vertical plane of the baling-cylinder, and within this opening is arranged a series of radially-disposed conical compression-rollers 24, having their inner and outer spindle extremities 25 and 26 disposed coaxially in an oblique plane to present the lower faces of the several rollers in the same horizontal plane, so that the said rollers will constitute a horizontal abutment for the upper end of the column of compressed material. The rollers 24 radiate from the center of the roller-carriage in spaced relation, and their inner spindle extremities 25 are loosely journaled in the inner bearings 27, provided in a bearing-hub 28, fixed at the center of the central opening through the roller-carriage 17 and rigidly retained by a plurality of brace bars or webs 29, disposed intermediate of certain of the rollers and extending radially from the hub 28 to the inner circular wall or compression-ring 30 of the roller-carriage. This wall or ring 30, as is explained in my Patent No. 698,353, and as will be hereinafter noted, constitutes means opposing resistance to the centripetal movement of the cotton located immediately below the compression-rollers.

The rollers 24 are mounted for longitudinal adjustment by screws 31, engaging threaded openings 32 in the rim 18 and bearing at their inner ends against antifriction-balls 33, interposed between the screws and the outer spindles of the rollers. For the purpose of positively operating the rollers through the rotation of the movable press element or member a driving-gear 35 is splined upon the outer spindle extremity 26 of each roller and has its hub 36 journaled in a bearing 37, formed in a hanger 38, located within the carriage. This form of mounting leaves the rollers free to be adjusted longitudinally for the purpose of increasing the surface speed thereof with respect to the fiber being compressed and permits the gears 35 to rotate the rollers by engagement with a circular rack 39, formed in the upper face of the frame-plate 5, so that as the compressing-head of the press is rotated it will constitute the medium through which rotary movement is imparted to the several rollers at a higher rate of speed than could possibly be obtained from mere frictional contact of the rollers with a plane surface. While the positive rotation of the rollers in the manner stated has only a collateral relation to the present improvements, it may be explained that this feature of the press was designed to overcome the waves or undulations of fibrous material which previous to its adoption had formed in advance of the rollers and served ultimately to prevent the effective operation of the press.

The inner wall 30 of the roller-carriage 17 constitutes a compression-ring of less diameter than the chamber or cylinder 6 and is recessed for the passage of the rollers 24, the lower edges of which are disposed in a slightly lower plane than the lower edge 39ª of the compression-ring. This ring is supported at its upper end by a spacing-ring 40, interposed between the ring 30 and the guard-ring 41, secured within the opening 10 in the top wall of the roller-carriage, the rings 40 and 41 being located in the plane of the top wall of the carriage. This compression-ring, which, like the positive rotation of the rollers, is not disclosed for the first time in this application, is designed to overcome the tendency of the cotton directly below the compression-rollers to draw inwardly from the outer edge of the bale toward the center thereof. It is unnecessary for present purposes to discuss the reason for this centripetal movement of the cotton; but it should be noted that the compression-ring, bearing, as it does, upon the upper end or face of the column of fibrous material within the baling-chamber at a point adjacent to the outer edge of the bale, presents considerable resistance to the indrawing of the cotton toward the center of the bale, and thereby materially aids in the production of a bale of uniform density.

In the illustrated construction I have shown a pair of feeding-spaces 42, located at diametrically opposite sides of the center of the compressing-head and defined between pairs of rollers which are separated to a slightly greater extent than the other rollers of the head. These feeding-spaces extend from the hub 28 to the interior surface of the cylinder 6, the compression-ring 30 being cut away at opposite sides to form vertical feed-slots 43, the front wall 44 of each of which is inclined and the rear walls 45 of said slots being vertically disposed and located substantially in the vertical plane of the axes of the adjacent rollers 24. To confine the cotton to the vertical plane of the cylinder—that is to say, to prevent the fiber escaping through the slots 43 from extending laterally beyond the vertical plane of the wall of the baling-chamber—I provide, as shown in one of my former patents, guard-plates 46, depending from the guard-ring 41 opposite the slots 43 and extending practically to the upper face of the bottom plate 5.

The construction thus far described is not novel; but since an understanding of the construction and operation of the press is essential to a clear comprehension of my present improvements and since the latter bear an intimate relation to the improvements heretofore devised I have deemed it to be necessary to describe the construction of the press in detail and to explain at some length the objectionable features of roller-presses as heretofore constructed and the means whereby I have sought to overcome such objections and to produce a perfectly operative press.

It will be understood that the cotton or other loose fiber is fed in bulk through the opening 10ª and is drawn down through the feed-spaces and laid layer upon layer in spiral form above the follower 7, which effects the compression of the column of fiber formed above the same and recedes as the bale increases in size. I have explained how the positive rotation of the compression-rollers at a speed greater than normal overcomes the accumulation of cotton in advance of the rollers and also how the provision of the compression-ring 30 resists the movement of the cotton toward the center of the bale. I find in practice, however, that there exists an objectionable tendency of the cotton being fed to the press to move outwardly toward the outer edge of the bale. This tendency, due at least in part to the rotation of the head, prevents the rollers from drawing down a uniform bat or layer, and therefore the completed bale lacks uniform density, notwithstanding the fact that by my previous improvements I have overcome the objectionable tendency of the cotton composing the bale to draw toward the center thereof. Having, therefore, overcome the centripetal tendency of the cotton below the rollers, I now propose to overcome the centrifugal tendency of the cotton above the rollers. This end is attained by the employment of what may be termed a "feed-guide" 47, of substantially circular form, located within the compressing-head and serving to receive the cotton and to hold it out of contact with the rollers except at the feeding-spaces, where the loose cotton is drawn down by the rollers to form the bats or layers. This feed-guide is of substantially circular form to fit snugly within the wall or compression-ring 30 and is trunco-conical or dish-shaped to conform to the inclined upper sides of the compression-rollers. At its center the guide is provided with a cap or dome 48, fitting upon the hub 28, and at the opposite sides of the dome said guide is cut away to form feed-openings 49, located above the feed-spaces 42 of the compressing-head. The opposite side edges 50 and 51 of each of these feed-openings in the feed-guide are radial to the axis of the head and are each disposed above the center of the adjacent compression-roller. The result of this relation of parts is that the cotton is held away from the rollers except at the feed-openings, where certain of the rollers effect the feeding of the cotton from the feed-guide to the baling-chamber. I have found by experiment that the provision of this dish-shaped feed-guide effectually overcomes the tendency of the cotton above the compression-rollers to move outwardly, thus insuring the feeding of the cotton in a uniform bat to the compression-chamber, where it is compressed to form a bale of uniform density.

The resistance opposed by the feed-guide to the outward movement of the cotton thereabove may, if desired, be increased by the formation of projections or ribs on the upper surface of the guide. In Fig. 5 I have shown a modified form of guide provided with concentric projections or ribs 52, and in Fig. 6 is shown a guide provided with ribs 53 arranged spirally.

In Fig. 7 I have shown a guide provided with a single feed-opening 49ª, it being obvious that one or more feed-openings may be provided in the guide in accordance with the number of feed-spaces in the compressing-head.

It is thought that from the foregoing the construction and operation of my cotton-press will be clearly apparent; but while the illustrated embodiments of the invention are believed at this time to be preferable I wish to be distinctly understood as reserving to myself the right to effect such changes, modifications, and variations of the illustrated structure as may be fairly embraced within the scope of the protection prayed.

What I claim is—

1. In a press of the character described, the combination with a baling-chamber, and a rotary compressing-head comprising a series of compression-rollers, of means for effecting the relative rotation of the head and chamber, and means for preventing undue outward or centrifugal movement of the fiber being fed to the press.

2. In a press of the character described, the combination with a follower, and a rotary compressing-head comprising a series of compression-rollers, of means located above the rollers for preventing undue outward or centrifugal movement of the fiber being fed to the press.

3. In a press of the character described, the combination with a baling-chamber, and a rotary compressing-head comprising a series of compression-rollers and having radial feed-spaces, of means for effecting the relative rotation of the head and chamber, and means located above the rollers for guiding the fiber to the feed-spaces and for preventing undue outward or centrifugal movement of the fiber being fed to the press.

4. In a press of the character described, the combination with a follower, and a compressing-head comprising a series of compression-rollers and having feed-spaces defined between certain of the rollers, of a feed-guide located above the rollers and serving to guide said fiber to the feed-spaces and to sustain the fiber out of contact with all of the rollers, except those between which the feed-spaces are defined.

5. In a press of the character described, the combination with a baling-chamber, and a compressing-head comprising a series of compression-rollers between certain of which one or more feed-spaces are defined, of a feed-guide disposed over all of the rollers to support the loose fiber and having a feed opening or openings arranged opposite the feed-spaces of the head.

6. In a press of the character described, the combination with a follower, and a compressing-head comprising a series of compression-rollers and having a radial feed-space, of a detachable feed-guide plate disposed over all of the rollers to support the loose fiber and having a radial feed-opening coincident with the feed-space of the head.

7. In a press of the character described, the combination with a baling-chamber, and a compressing-head comprising a series of conical compression-rollers, of a feed-guide plate located above the rollers and having a radial feed-opening through which the cotton is fed to the rollers.

8. In a press of the character described, the combination with a follower, and a compressing-head comprising a series of radially-disposed conical compression-rollers, of a dished feed-guide plate located above the rollers to support the loose fiber and having a feed-opening through which the fiber is fed to the rollers.

9. In a press, the combination with a baling-chamber, and a compressing-head comprising a series of compression-rollers, of a substantially dish-shaped feed-guide plate having a feed-opening and means located at the center of the guide to retain the same in place.

10. In a press of the character described, the combination with a follower, and a compressing-head comprising a central hub and a series of compression-rollers radiating therefrom, of a feed-guide located above the rollers, said feed-guide having a feed-opening and a dome fitting over the hub.

11. In a press of the character described, the combination with a baling-chamber, and a compressing-head comprising a central hub and a series of radially-disposed conical compression-rollers, of a dished feed-guide plate formed with a central dome fitted removably over the hub and having a feed-opening extending radially from the dome.

12. A feed-guide for roller-presses of inverted trunco-conical form, having a cap or dome at its center and a feed-opening.

13. In a press of the character described, the combination with a baling-chamber, a compressing-head, and means for effecting the relative rotation of the head and chamber, of means for preventing undue outward movement of the fiber being fed to the press, and means for opposing resistance to the undue inward movement of the fiber located below the compressing-head.

14. In a press of the character described, the combination with a follower, and a rotary compressing-head, of means located above the head to prevent undue outward movement of the fiber being fed to the press, and means engaging the fiber which has been fed to the press to oppose the inward movement thereof toward the center of the bale.

15. In a press of the character described, the combination with a frame, and a compressing-head including a series of compression-rollers, of a compression-ring disposed to bear against the end of the bale at points intermediate of the rollers to oppose resistance to the undue drawing of the fiber toward the center of the bale, and a feed-guide fitting within the compression-ring above the rollers to support the fiber and having a feed-opening, said feed-guide constituting means for preventing undue outward movement of the fiber being fed to the press.

16. In a press of the character described, the combination with a follower, and a compressing-head comprising a series of compression-rollers, of a feed-guide disposed above the rollers to guide the fiber to a feed-space defined between a pair of rollers and retaining said fiber otherwise out of contact with the rollers.

17. In a press of the character described, the combination with a follower, and a compressing-head comprising a series of radial compression-rollers, of a feed guide-plate detachably carried by the head and having radial feed-openings.

18. In a press of the character described, the combination with a follower, and a rotary compressing-head, of a feed guide-plate carried by the head and provided with one or more radial feed-openings, and means for opposing resistance to the undue inward movement of the fiber located below the compressing-head.

19. In a press of the character described, the combination with a follower, and a rotary compressing-head comprising a series of radially-disposed conical compression-rollers, of a dished guide-plate located above the rollers and having one or more radial feed-openings, and means for opposing resistance to the undue inward movement of the fiber located below the compressing-head.

In testimony that I claim the foregoing as my own I have hereto affixed my signature in the presence of two witnesses.

J. J. ATKINSON.

Witnesses:
JAMES A. LANE,
P. L. PRENDORFF.